US010739650B1

(12) United States Patent
Basu

(10) Patent No.: US 10,739,650 B1
(45) Date of Patent: Aug. 11, 2020

(54) UTILIZING 2D H-BN NANOSHEETS AS THE PLANAR-ALIGNMENT AGENT IN AN ELECTRO-OPTICAL LIQUID CRYSTAL DEVICE TO IMPROVE ITS OPTICAL TRANSMISSION

(71) Applicant: The Government of the United States of America, as represented by the Secretary of the Navy, Arlington, VA (US)

(72) Inventor: Rajratan Basu, Annapolis, MD (US)

(73) Assignee: The Government of the United States of America, as represented the Secretary of the Navy, Washington, DC (US)

(*) Notice: Subject to any disclaimer, the term of this patent is extended or adjusted under 35 U.S.C. 154(b) by 0 days.

(21) Appl. No.: 16/655,346

(22) Filed: Oct. 17, 2019

Related U.S. Application Data

(60) Provisional application No. 62/814,021, filed on Mar. 5, 2019.

(51) Int. Cl.
*G02F 1/1337* (2006.01)
*G02F 1/1347* (2006.01)
G02F 1/1333 (2006.01)
G02F 1/1335 (2006.01)

(52) U.S. Cl.
CPC ...... *G02F 1/1347* (2013.01); *G02F 1/133784* (2013.01); *G02F 1/13336* (2013.01); *G02F 2001/133302* (2013.01); *G02F 2001/133354* (2013.01); *G02F 2001/133357* (2013.01); *G02F 2001/133565* (2013.01)

(58) Field of Classification Search
CPC .................. G02F 1/1347; G02F 1/133784
See application file for complete search history.

(56) References Cited

U.S. PATENT DOCUMENTS

| 3,982,820 A * | 9/1976 | Hattori | G02F 1/1337 349/132 |
| 2019/0384083 A1* | 12/2019 | Basu | G02F 1/133723 |
| 2020/0095432 A1* | 3/2020 | Wang | C09D 5/082 |

OTHER PUBLICATIONS

Basu, Rajratan, and Lukas J. Atwood. "Reduced ionic effect and accelerated electro-optic response in a 2D hexagonal boron nitride planar-alignment agent based liquid crystal device," Optical Materials Express 9.3 (2019): 1441-1449.
Basu, Rajratan, and Lukas J. Atwood. "Two-dimensional hexagonal boron nitride nanosheet as the planar-alignment agent in a liquid crystal-based electro-optic device." Optics express 27.1 (2019): 282-292.
Shehzad, Muhammad Arslan, et al. "Nematic liquid crystal on a two dimensional hexagonal lattice and its application." Scientific reports 5 (2015): 13331.

* cited by examiner

*Primary Examiner* — James A Dudek
(74) *Attorney, Agent, or Firm* — U.S. Naval Academy; Stephen T. Hunnius

(57) ABSTRACT

An electro-optical liquid crystal cell comprising a first substrate, a first layer of indium tin oxide (ITO) on the first substrate, a first layer of h-BN on the first layer of ITO on the first substrate, and a layer of liquid crystal on the first layer of h-BN on the first layer of ITO on the first substrate. Furthermore, the electro-optical liquid crystal cell can comprise a second layer of h-BN, a second layer of ITO, and a second substrate. This h-BN cell exhibits the required electro-optic effect needed for a liquid crystal display. This h-BN cell exhibits high optical transmission.

8 Claims, 3 Drawing Sheets

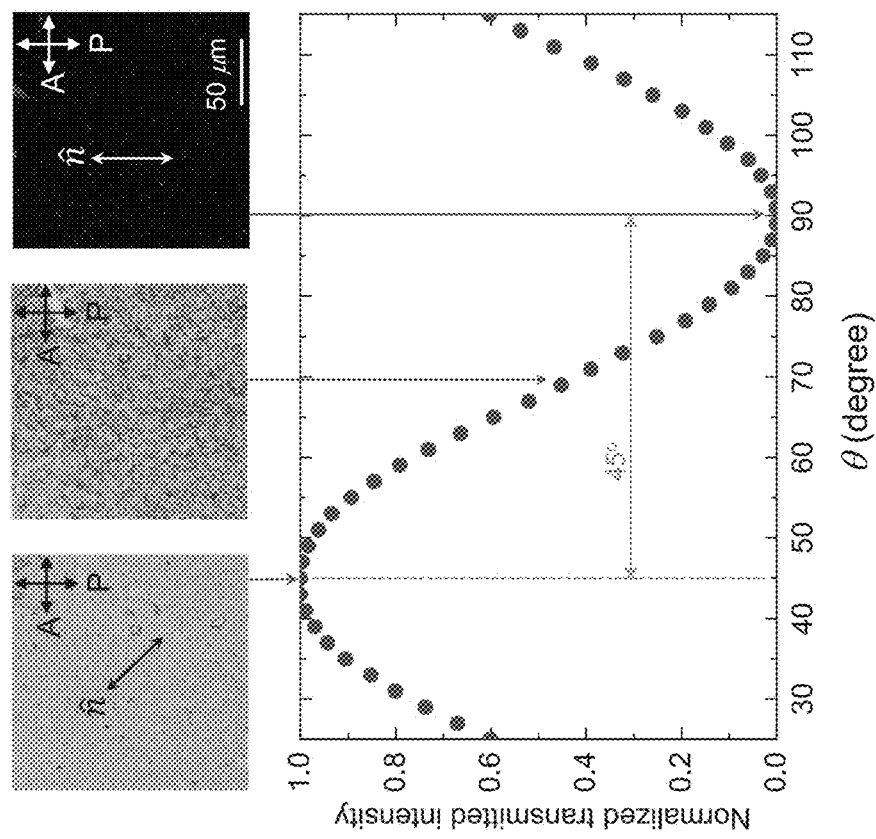
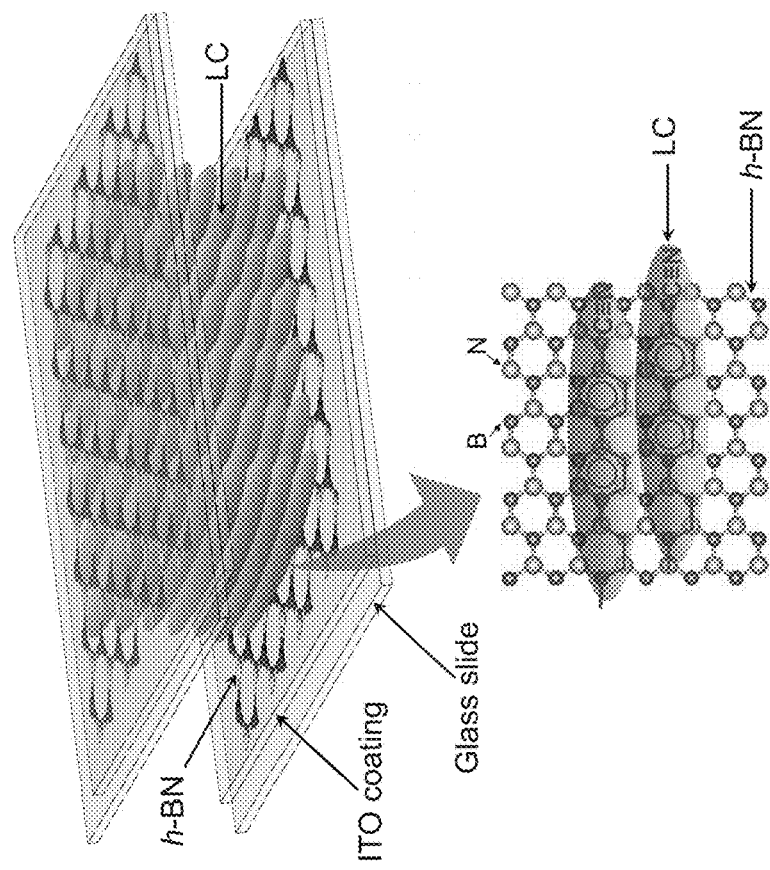
FIG. 1B
FIG. 1A

UTILIZING 2D H-BN NANOSHEETS AS THE PLANAR-ALIGNMENT AGENT IN AN ELECTRO-OPTICAL LIQUID CRYSTAL DEVICE TO IMPROVE ITS OPTICAL TRANSMISSION

REFERENCE TO RELATED APPLICATION

This application is a non-provisional of, and claims priority to and the benefits of, United States Provisional Patent Application No. 62/814,021 filed on Mar. 5, 2019, the entirety of which is herein incorporated by reference.

BACKGROUND

This disclosure concerns utilizing two-dimensional (2D) hexagonal boron nitride (h-BN) nanosheets as the planar-alignment agent in an electro-optical liquid crystal (LC) device and thereby improving its optical transmission.

This disclosure concerns methods for achieving planar-alignment of liquid crystal (LC) employing two-dimensional (2D) hexagonal boron nitride (h-BN) nanosheets in an electro-optic LC device.

This disclosure concerns procedures for attaining electro-optic switching of an LC in this h-BN-based LC device.

A novel product is described herein with an h-BN-based LC device that exhibits more optical transparency than a regular polyimide (PI) alignment layer-based LC device.

Liquid crystals (LCs) are optically anisotropic materials, and they are widely used in electro-optical display technology. Understanding the alignment phenomena of a nematic LC on a surface remains an important area of research, as the alignment process determines the LC's molecular orientation and conformation—which influence the LC's optical and electro-optical characteristics.

Semi-transparent LC cells are used in optically transmissive liquid crystal displays (LCDs), where the planar-alignment layers are utilized to create an easy axis of the nematic director ($\hat{n}$) of the LC.

The conventional planar-alignment agent is a rubbed polyimide (PI)-coated surface. On the unidirectionally rubbed PI alignment substrate, the LC molecules align with alkyl side chains along the rubbing direction, creating a uniform planar director profile on the substrate.

However, the conventional rubbed PI alignment process has some disadvantages. The temperature during the rubbing process of the PI has a significant impact on the LC alignment. The occurrence of fiber dust during the rubbing process of the PI contaminates the LC. Uneven rubbing creates a wide distribution of pre-tilt angles of the LC—which causes a non-uniform brightness in the LCD panel. The PI alignment layers can inject free ion impurities into the LC.

Therefore, there is a long-standing need to find alternative alignment agents for LCDs.

Here, we demonstrate the first use of the two-dimensional (2D) hexagonal boron nitride (h-BN) as the planar-alignment agent in an electro-optic LC device.

This h-BN-based LC device shows the required electro-optic effect for an LCD. This electro-optic device also shows higher optical transparency than a regular PI alignment layer-based LC device.

Replacing the PI alignment layers with h-BN nanosheets effectively reduces the thickness of all the alignment layers 120 nm to less than 1 nm. For electro-optic devices, the order of magnitude reduction in path length through absorbing layers makes it possible to achieve higher optical throughput.

SUMMARY OF DISCLOSURE

Description

This disclosure teaches methods and the products for utilizing two-dimensional (2D) hexagonal boron nitride (h-BN) nanosheets as the planar-alignment agent in an electro-optical liquid crystal (LC) device and thereby improving its optical transmission.

This disclosure concerns methods for achieving planar-alignment of liquid crystal (LC) employing two-dimensional (2D) hexagonal boron nitride (h-BN) nanosheets in an electro-optic LC device.

This disclosure concerns procedures for attaining electro-optic switching of an LC in this h-BN-based LC device.

A novel product with h-BN-based LC device that exhibits more optical transparency than a regular polyimide (PI) alignment layer-based LC device.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

FIG. 1A illustrates a schematic representation of the h-BN/ITO cell where the two h-BN nanosheets are well-aligned with each other and the LC domain in-between maintains a uniform planar-alignment.

FIG. 1B illustrates results when the h-BN/ITO cell (filled with LC E7) was rotated under a crossed-polarized microscope to record the change in the transmitted intensity through the cell at every 2° rotation step. FIG. 1B illustrates the micrographs of the LC texture in the h-BN/ITO cell, where $\theta=45°$, $45°<\theta<90°$, and $\theta=90°$, respectively. The graph in FIG. 1B shows the normalized transmitted intensity of the h-BN/ITO LC cell under the crossed polarized microscope as a function of $\theta$. Clearly, FIG. 1B exhibits a bright uniform texture of the LC as $\hat{n}$ is at 45° with respect to the crossed polarizers.

of LC E7 in the h-BN/ITO device as a function of the applied ac voltage.

Figure 3:
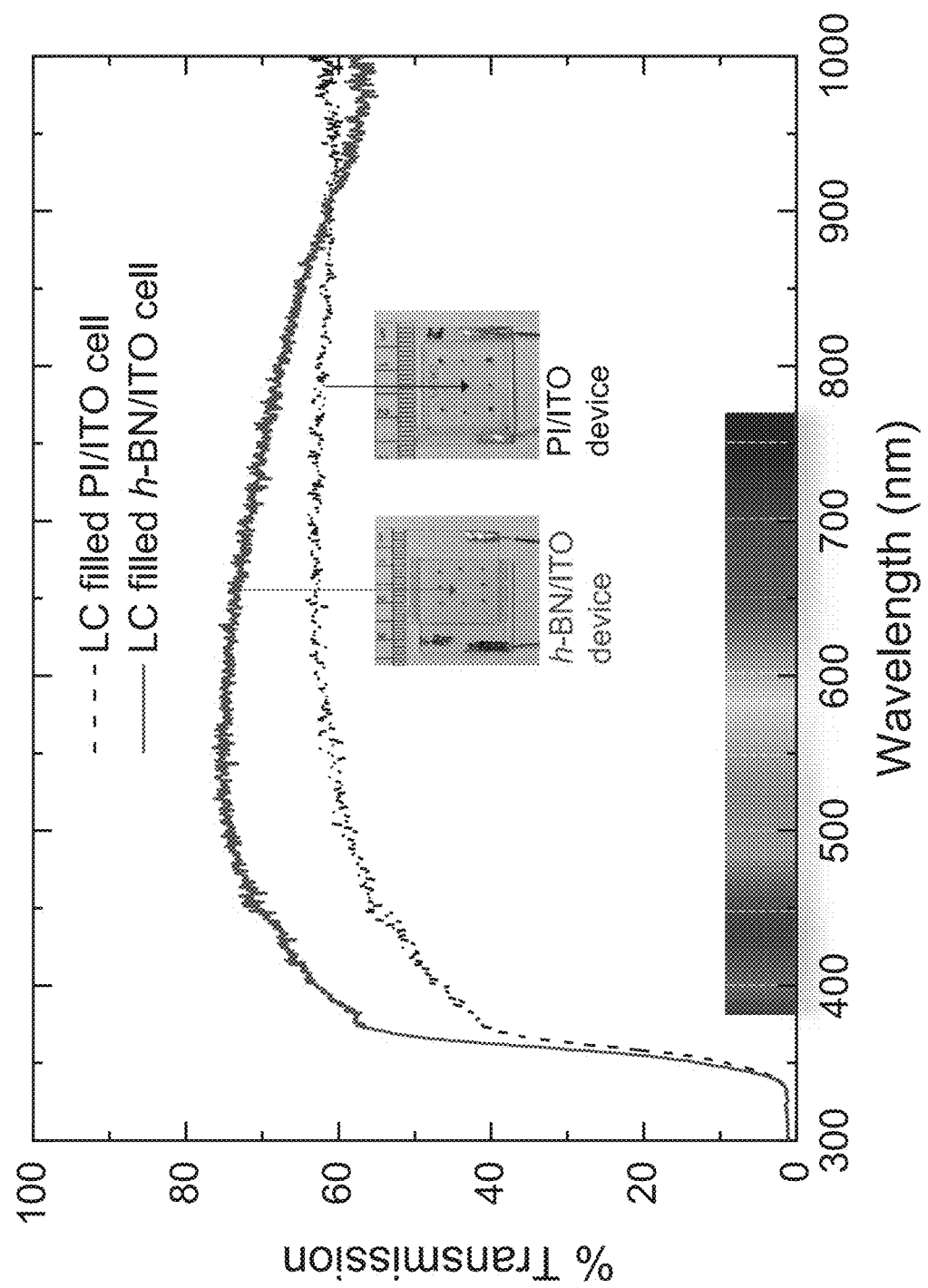

FIG. 3 illustrates the optical transmission spectra of the LC-filled commercial PI/ITO cell and the LC-filled h-BN/ITO cell as taken separately using FLAME-S-XR1-ES (Ocean Optics, Inc.) spectrometer and DH-2000-BAL UV-VIS-NIR (Ocean Optics, Inc.) light source. The transmission spectra are shown for these cells in the wavelength ($\lambda$) range from 300 nm (UV) to 1000 nm (near IR). The h-BN/ITO cell clearly indicates more optical transparency than the commercial PI/ITO cell.

DETAILED DESCRIPTION OF THE INVENTION

This disclosure teaches methods and devices for utilizing two-dimensional (2D) hexagonal boron nitride (h-BN) nanosheets as the planar-alignment agent in an electro-optical liquid crystal (LC) device and thereby improving its optical transmission.

This disclosure concerns methods for achieving planar-alignment of liquid crystal (LC) employing two-dimensional (2D) hexagonal boron nitride (h-BN) nanosheets in an electro-optic LC device.

This disclosure concerns procedures for attaining electro-optic switching of an LC in this h-BN-based LC device.

A novel product with h-BN-based LC device that exhibits more optical transparency than a regular polyimide (PI) alignment layer-based LC device.

This electro-optic device also shows higher optical transparency than a regular PI alignment layer-based LC device.

Replacing the PI alignment layers with h-BN nanosheets effectively reduces the thickness of all the alignment layers 120 nm to less than 1 nm. For electro-optic devices, the order of magnitude reduction in path length through absorbing layers makes it possible to achieve higher optical throughput.

Example 1

The Electro-Optic LC Cell Employing 2D h-BN as the Planar-Alignment Agent.

In an h-BN lattice, the B—N bond length is 1.44 Å. In a hexagonal benzene ring, the C—C bond length is 1.40 Å. Therefore, the hexagon of the benzene ring and the hexagon in the h-BN lattice have almost the same size.

This nano-architectural symmetry between the hexagons in both the species causes the benzene rings of the LC to align coherently on the hexagonal lattice of h-BN.

This spontaneous alignment mechanism of the LC on the hexagonal lattice is the fundamental principle in our experiment for using the 2D h-BN as the planar-alignment agent in this electro-optic LC device.

Example 2

Fabricating the Electro-Optic LC Cell Employing 2D h-BN as the Planar-Alignment Agent.

Chemical Vapor Deposition (CVD) grown monolayer h-BN film on a copper foil was obtained from Graphene Supermarket, Inc. The standard polymethyl-methacrylate (PMMA) assisted wet transfer method was used to transfer the monolayer h-BN film from the copper foil onto several 2.5×2.5 cm$^2$ ITO coated glass substrates.

The h-BN-based cell (with average cell-gap d=9 μm) was prepared by placing together two h-BN/ITO glass substrates with the h-BN sides facing each other in the same direction.

FIG. 1A shows a schematic representation of the h-BN/ITO cell where the two h-BN nanosheets are well-aligned with each other and the LC domain in-between maintains a uniform planar-alignment.

Example 3

The alignment of this embodiment was tested in a prototype device using a crossed-polarized microscope. This prototype h-BN/ITO cell (filled with LC E7) was rotated under the crossed-polarized microscope to record the change in the transmitted intensity through the cell at every 2° rotation step, and the results are presented in FIG. 1B. The angle between the average LC director n in the h-BN/ITO LC cell and the analyzer is defined by θ. FIG. 1B shows the micrographs of the LC texture in the h-BN/ITO cell, where θ=45°, 45°<θ<90°, and θ=90°, respectively. The graph in FIG. 1B shows the normalized transmitted intensity of the h-BN/ITO LC cell under the crossed polarized microscope as a function of θ.

Clearly, FIG. 1B exhibits a bright uniform texture of the LC as n̂ is at 45° with respect to the crossed polarizers.

When the sample is further rotated by 45°, n̂ becomes parallel to the polarizer, which clearly reveals a dark uniform texture in the corresponding micrograph. This is the same optical behavior of the LC texture in a standard rubbed PI/ITO cell under the crossed-polarized optical microscope.

This transition of the transmitted intensity from a uniform bight texture to a uniform dark texture at every 45°rotation confirms that 2D h-BN imposes a uniform planar-alignment on the nematic phase due to the hexagonal symmetry matching between the LC's benzene rings and the h-BN's honeycomb structure.

Example 4

Electro-Optical Effect of LC in h-BN/ITO Cell.

The other embodiment of this invention is that the h-BN/ITO LC cell exhibits the typical electro-optical effect—which is essential for the LCD technology.

The electrically-controlled birefringence effect (ECBE) in an LC is observed when n̂ rotates from the initial planar orientation to homeotropic orientation as the applied electric field in the cell exceeds its threshold value. As n̂ rotates, the LC's effective birefringence, <Δn> changes as a function of applied voltage. If n̂ is initially oriented at 45° with the crossed polarizers, then the transmitted intensity at the exit of the analyzer varies as $$I = I_o \sin^2\left(\frac{\pi d \langle \Delta n \rangle}{\lambda}\right)$$

where $I_o$ is the intensity of the plane polarized light incident on the LC cell, d is the cell-gap, and λ is the wavelength of the monochromatic light.

As <Δn> changes during the rotation of n̂ in the presence of the applied field, a change in the phase difference, $$\Delta\phi = \frac{2\pi d \langle \Delta n \rangle}{\lambda}$$

causes an oscillatory optical signal at the exit of the analyzer. The ECBE of LC E7 in this prototype h-BN/ITO device was studied using an optical setup consisted of a 5-mW He-Ne laser beam (λ=633 nm) that passed through a polarizer, the h-BN/ITO LC cell (where is n̂ oriented at 45° with respect to the polarizer), a crossed analyzer, and into a photodetector which was connected to a dc voltmeter to measure the transmitted intensity, I.

The applied ac voltage (f=1000 Hz) across the cell was ramped up, and the change in I was detected from the dc voltmeter. This experiment was also carried out under the crossed polarized microscope (with a white light source instead of the laser) to take several micrographs of the h-BN/ITO cell at different applied voltages.

Figure 2A:
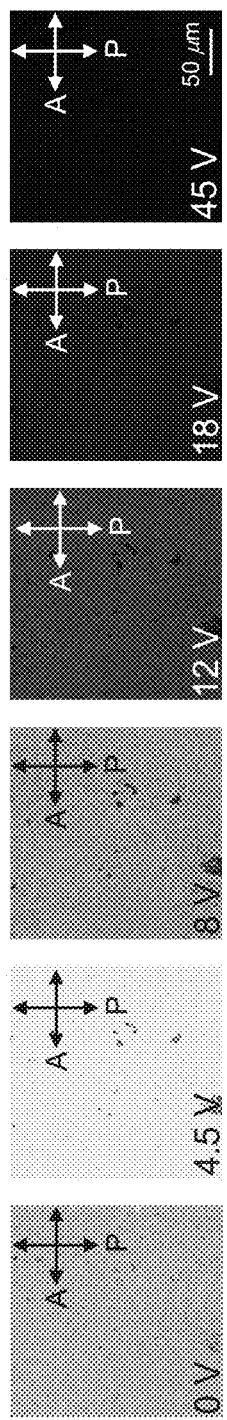
FIG. 2A illustrates the micrographs of the LC texture in the h-BN/ITO device under the crossed polarized microscope at different ac voltages.
Figure 2B:
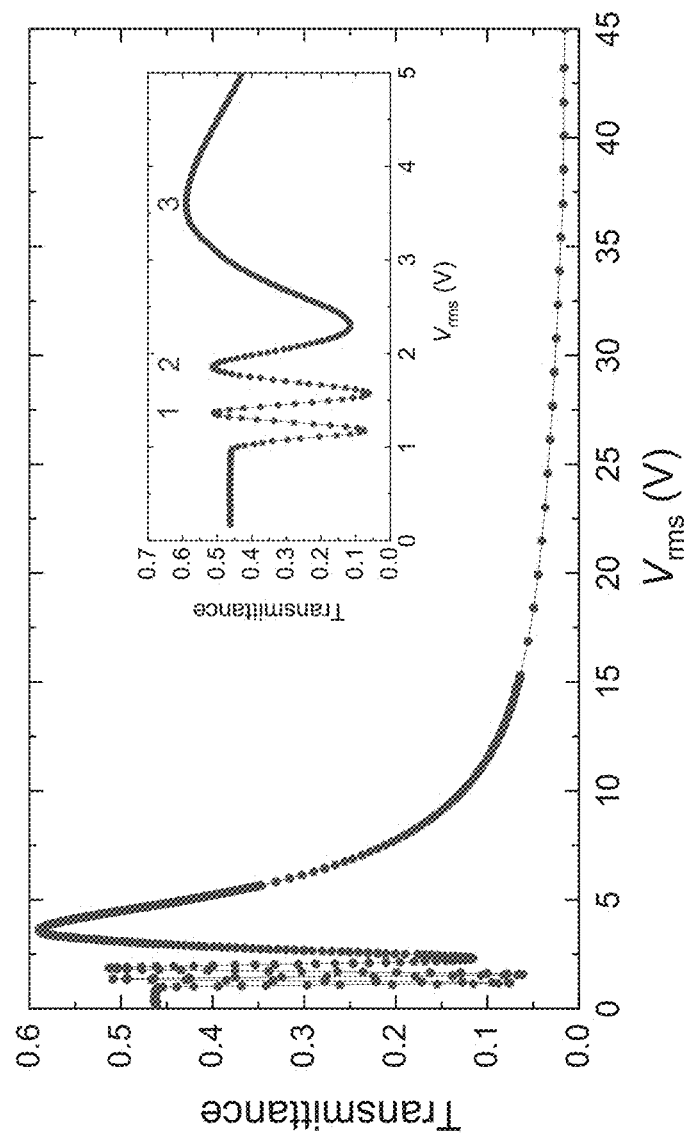
FIG. 2B exhibits the transmittance, $$\frac{I}{I_o}$$

FIG. 2A shows the micrographs of the LC texture in the h-BN/ITO device under the crossed polarized microscope at different ac voltages. FIG. 2B exhibits the transmittance, $$\frac{I}{I_o}$$

of LC E7 in the h-BN/ITO device as a function of the applied ac voltage.

The transmittance curve clearly follows the oscillatory response according to Eq. 1. The intensities of the micrographs do not directly correspond to the transmittance curve, as the micrographs were taken under white light, and the transmittance curve was obtained using a red laser (i.e., a monochromatic source).

When n̂ rotates from the planar state to the homeotropic state as the applied voltage increases, the number of maxima that appears in the transmittance curve in FIG. 2B is given by $$\frac{d\Delta n}{\lambda}.$$

Now, using the experimental parameters of our prototype device, $\Delta n=0.225$ for LC E7, $\lambda=633$ nm for the He-Ne laser and, the h-BN/ITO cell-gap, d=9 μm, we obtain $$\frac{d\Delta n}{\lambda} \approx 3.$$

The inset in FIG. 2B presents the same transmittance curve in a smaller voltage range. This inset depicts three maxima, confirming a complete director rotation from the planar state to the homeotropic state in the cell. The inset also shows a typical Fréedericksz transition upon the application of an electric field across the cell.

The results indicate that the h-BN/ITO cell exhibits the required ECBE for an LC device—where the 2D h-BN films at both sides act as the planner-alignment agent.

Example 4

Optical Transmission Spectroscopy of the Electro-Optic h-BN/ITO Cell.

We demonstrated that the h-BN/ITO LC device exhibits more optical transparency than a commercial PI/ITO LC cell.

The optical transmission spectra of the LC-filled commercial PI/ITO cell and the LC-filled h-BN/ITO cell were taken separately using FLAME-S-XR1-ES (Ocean Optics, Inc.) spectrometer and DH-2000-BAL UV-VIS-NIR (Ocean Optics, Inc.) light source. The transmission spectra for these cells in the wavelength ($\lambda$) range from 300 nm (UV) to 1000 nm (near IR) are shown in FIG. 3.

The h-BN/ITO cell clearly indicates more optical transparency than the commercial PI/ITO cell, as shown in FIG. 3.

Example 5

In the commercial cell, the total thickness of the two rubbed planar-aligning PI (KPI-300B, Kelead Photoelectric Materials Co., Ltd.) layers was about 120 nm.

On the other hand, the thickness of our 2D h-BN film is around 0.3 nm.

Replacing both the PI alignment layers with the 2D h-BN on both sides decreases this effective thickness to less than 1 nm—which leads to the potential to reduce the transmissive losses over a broad spectral range in the electro-optic LC device.

The hexagonal 2D layer is not necessarily limited to h-BN, but includes any other 2D hexagonal material to align LC materials and mixtures. Potential materials include, but are not limited to, graphene, borophene, germanine, phosphorene, silicone, and molybdenite.

The h-BN nanosheets can be chemically modified directly to promote uniaxial LC alignment on the surface.

Uniaxial alignment of LC on h-BN can be promoted by adding an additional photoalignment step, whereby polarized light is used to absorb or chemically bond LC-compatible molecules to the h-BN surface.

Uniaxial alignment of LC on h-BN can be promoted by non-surface means including, but not limited to flow alignment, photo-orientation and slow cooling from the isotropic phase.

The LC layer can be comprised of a single molecular component or mixtures of components with a liquid crystal phase, including but not limited to nematic, cholesteric, smectic and discotic phases.

The LC can possess a positive or negative dielectric anisotropy and a permanent molecular dipole to facilitate molecular switching in response to an applied voltage.

The h-BN can be multi-layered.

Our invention demonstrates the utility of 2D h-BN as the planar-alignment agent.

This invention discloses that the h-BN/ITO LC device demonstrates an excellent electrically-controlled birefringence effect.

This invention enables a new product employing 2D h-BN as the planar-alignment agent in an LC display to reduce the transmissive losses (i.e., to increase the optical transparency) over a broad spectral range.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

I claim:

1. An electro-optical liquid crystal cell, comprising:
   a first substrate;
   a first layer of indium tin oxide (ITO) on the first substrate;
   a first layer of two-dimensional hexagonal boron nitride (h-BN) nanosheet on the first layer of ITO on the first substrate;
   wherein the first layer of two-dimensional hexagonal boron nitride (h-BN) nanosheet has a thickness of about 0.3 nm; and a layer of liquid crystal on the first layer of h-BN on the first layer of ITO on the first substrate;
  wherein the layer of liquid crystal comprises liquid crystal molecules; and
  wherein the liquid crystal molecules achieve a uniform planar aligned state due to the epitaxial interaction between the liquid crystal molecules and the h-BN nanosheet.

2. The electro-optical liquid crystal cell of claim 1, further comprising:
  a second layer of h-BN nanosheet on the layer of liquid crystal;
    wherein the first layer of two-dimensional h-BN nanosheet and the second layer of h-BN nanosheet are aligned in the same direction to promote uniaxial liquid crystal alignment in the cell;
  a second layer of ITO on the second layer of h-BN on the layer of liquid crystal; and
  a second substrate on the second layer of ITO on the second layer of h-BN on the layer of liquid crystal.

3. The electro-optical liquid crystal cell of claim 2 wherein the second layer of h-BN has a thickness of about 0.3 nm.

4. The electro-optical liquid crystal cell of claim 3 wherein the cell-gap is about 9 μm.

5. An electro-optical liquid crystal cell utilizing a two-dimensional hexagonal boron nitride (h-BN) nanosheet as the planar-alignment agent, comprising:
  a first and second substrate;
  a layer of two-dimensional hexagonal boron nitride (h-BN) nanosheet as the planar-alignment agent on at least one of the first and second substrate; and
  a liquid crystal material between the first and second substrate;
  wherein an epitaxial interaction exists between the liquid crystal and the h-BN nanosheet.

6. A method of making an electro-optical liquid crystal cell, comprising:
  providing a first substrate;
  providing a first layer of indium tin oxide (ITO) on the first substrate;
  providing a first layer of two-dimensional hexagonal boron nitride (h-BN) nanosheet as the planar-alignment agent on the first layer of ITO on the first substrate; and
  providing a layer of liquid crystal on the first layer of two-dimensional hexagonal boron nitride (h-BN) nanosheet as the planar-alignment agent on the first layer of ITO on the first substrate;
    wherein the layer of liquid crystal comprises liquid crystal molecules; and
    wherein the liquid crystal molecules achieve a uniform planar aligned state due to the epitaxial interaction between the liquid crystal molecules and the h-BN nanosheet.

7. The method of making an electro-optical liquid crystal cell of claim 6, further comprising the steps of:
  providing a second layer of two-dimensional h-BN on the layer of liquid crystal;
  providing a second layer of ITO on the second layer of two-dimensional h-BN on the layer of liquid crystal; and
  providing a second substrate on the second layer of ITO on the second layer of two-dimensional h-BN on the layer of liquid crystal.

8. The method of making an electro-optical liquid crystal cell of claim 7
  wherein the first layer of two-dimensional h-BN has a thickness of about 0.3 nm and
  wherein the second layer of two-dimensional h-BN has a thickness of about 0.3 nm.

* * * * *